May 29, 1945.  A. W. PFEFFER  2,376,936
NAIL
Filed Dec. 1, 1943

Inventor
Anton W. Pfeffer
By
Glenn L. Fisk
Attorney

Patented May 29, 1945

2,376,936

UNITED STATES PATENT OFFICE 2,376,936

NAIL

Anton W. Pfeffer, Spokane, Wash.

Application December 1, 1943, Serial No. 512,496

1 Claim. (Cl. 85—10)

This invention relates to a nail and one object of the invention is to provide a nail so formed that when the nail is driven into boards and its penetrating end engages a backing-up block, continued blows delivered upon the head of the nail will cause portions of the nail intermediate the length of its shank to be crimped and form a lock projecting transversely from the shank of the nail and serving to firmly hold the nail in place. It will thus be seen that the nail will be held against longitudinal slippage by a lock embedded in one of the boards instead of by an exposed bent or clinched end of the nail and there will be no danger of the nail cutting a person's hand or scratching furniture or the like.

The invention is illustrated in the accompanying drawing, wherein.

Figure 1:
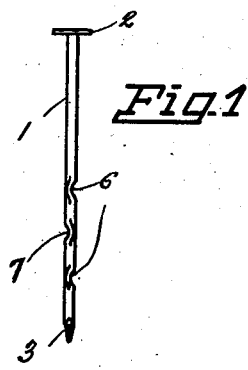
Fig. 1 is a view of a nail embodying the improved construction.

The improved nail constituting the subject matter of this invention is of the type known as a wire nail and has a shank 1 formed with a head 2 at one end and having its other end terminating in a penetrating point 3.

When nails of this type are driven through boards or the like 4 and 5 to secure them together, it is, at the present time, customary to use nails of greater length than the combined thickness of the two boards so that the penetrating end portion of a nail will protrude from the board 5, this penetrating end portion being turned and clinched against the exposed face of the board to clinch the nail against longitudinal slippage which would allow the boards to move out of tight face to face engagement with each other. This has been found objectionable as the bent or clinch ends of the nails are exposed and are liable to cut a person's hands or scratch or mar other articles with which they come in contact. If the nail becomes rusty, serious injury may result from being scratched or cut by the exposed end of the nail.

According to this invention, the shank of the nail is formed with a weakened portion intermediate its length but the weakened portion is sufficiently strong to permit the nail to be driven through the boards with a hammer. When, however, the nail has passed through the boards and its penetrating end makes contact with a metal block or plate serving as a backing for the nail, and additional blows are struck against the head of the nail, the weakened portion of the shank will buckle and form a crimped portion extending transversely from the shank within the board 5 and serve to firmly hold the nail against longitudinal slipping. Therefore, the two boards will be held in tight face to face engagement with each other but there will be no bent or clinched end portion of the nail protruding from the exposed surface of the board 5 and no damage can be done by the nail. While the improved nails are particularly adapted for use in securing boards of soft wood through which they may be driven without bending before striking a metal block used as a backing while clinching the nails, it will be understood that the improved nails may be used for securing boards formed of any material through which the nails may be driven without bending.

Figure 6:
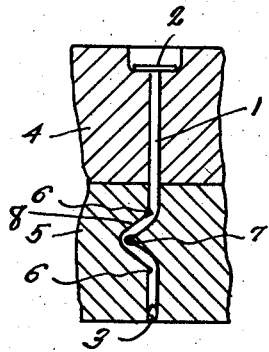
Fig. 6 is a view showing the nail of Fig. 1 in use.

The nail shown in Figure 1, has its shank formed with notches or recesses 6 and 7 spaced from each other longitudinally of the shank and located at opposite sides thereof. These recesses may be formed by subjecting the nail to pressure in a die, as shown, or by cutting the shank, and since the nail will tend to bend in the direction of the notches when blows are struck against the head 2 and the penetrating point is in contact with a backing-up block, the weakened portion of the shank will be crimped, as shown in Fig. 6, and form an anchoring portion 8 extending transversely from the shank within the board 5. Longitudinal slippage of the nail through the boards will thus be prevented and the boards will be held firmly in face to face engagement with each other.

Figure 2:
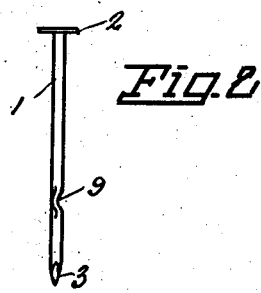
Fig. 2 is a view of a modified form of nail.
Figure 8:
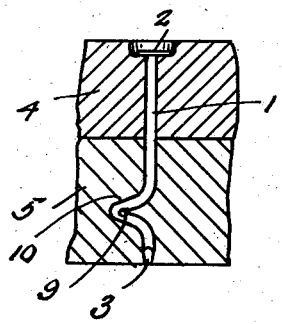
Fig. 8 shows the nail of Fig. 2 in use.

Instead of forming the nail with three recesses in its shank, it may be formed with a single recess 9, as shown in Fig. 2. When a nail of this construction is driven through the boards and its penetrating end encounters a backing-up block, the weakened portion of the shank crumples at the recess 9 and forms a transversely extending locking portion 10, as shown in Fig 8. This locking portion is similar to the locking portion 8, but since the shank is only formed with a single recess, the nail will be of the same thickness throughout its length except at the single recess and there will be little likelihood of the nail breaking at upper or lower ends of the anchor 10.

Figure 3:
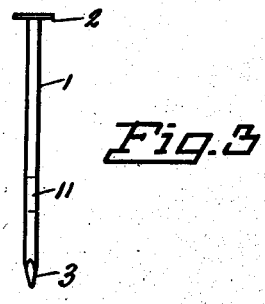
Fig. 3 is a view of another modified form of nail.
Figure 5:
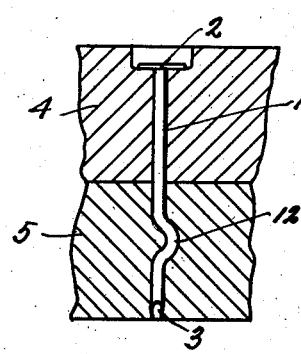
Fig. 5 is a view showing the nail of Fig. 3 in use.

In Fig. 3, the nail has its shank formed with an annealed portion 11 spaced from its penetrating end and, since this portion 11 is softer than the remainder of the shank, blows struck against the head of the nail when its point is bearing against a backing-up block will cause the weakened portion to crumple and form a longitudinally curved anchor 12, which is embedded in the board 5, as shown in Fig. 5.

Figure 4:
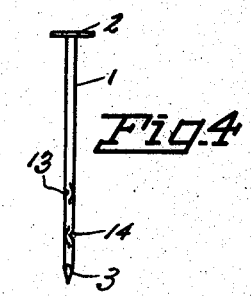
Fig. 4 is a view of still another modified form of nail.
Figure 7:
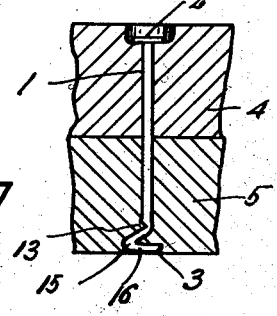
Fig. 7 is a view showing the nail of Fig. 4 in use.

Fig. 4 illustrates another embodiment of the invention, wherein the shank is formed in opposite side portions with recesses 13 and 14. These recesses are located near the penetrating point of the shank and when the penetrating point is backed up after driving the nail through the boards and additional blows are struck against the head of the nail, the weakened portion of the nail between the recess 13 and the penetrating point will crumple and form an anchor 15 having a portion 16 in parallel countersunk relation to the exposed surface of the board 5, as shown in Fig. 7. While the anchor 15 has a portion exposed, there will be no danger of a person cutting his hands against the nail as the exposed portion 16 is entirely countersunk in the exposed face of the board 5.

Having thus described the invention, what is claimed as new is:

A nail having a straight shank provided with a penetrating point at one end and adapted to be driven from its other end, said shank being formed in spaced relation to its penetrating end with relatively shallow substantially V-shaped depressions of uniform curvature located at opposite sides of the shank and forming weakened portions spaced from each other longitudinally of the shank, said nail when driven into place having its shank formed with a V-shaped crimp due to reverse bending of the shank at the weakened portions resulting from repeated driving impact after the point of the nail contacts a hard deflecting surface.

ANTON W. PFEFFER.